No. 683,840. Patented Oct. 1, 1901.
L. BLUNK.
WHEEL WRENCH.
(Application filed Jan. 26, 1901.)
(No Model.)
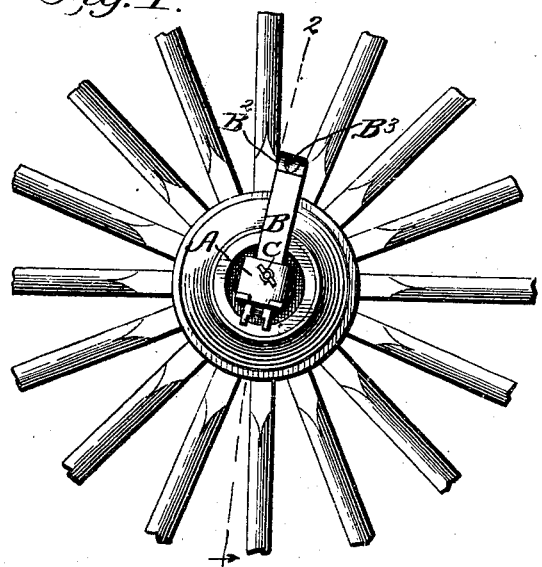
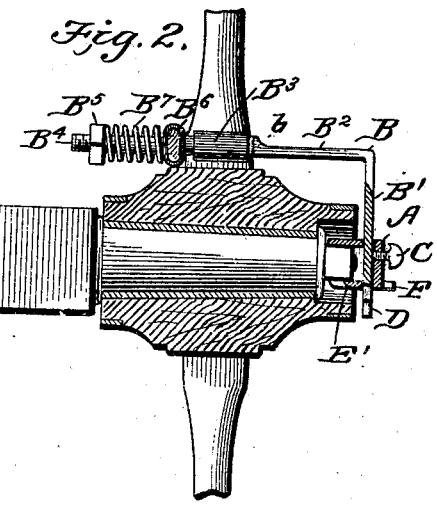
WITNESSES:
INVENTOR
Levi Blunk.
BY
ATTORNEYS

UNITED STATES PATENT OFFICE.

LEVI BLUNK, OF LOUISVILLE, KENTUCKY.

WHEEL-WRENCH.

SPECIFICATION forming part of Letters Patent No. 683,840, dated October 1, 1901.

Application filed January 26, 1901. Serial No. 44,895. (No model.)

*To all whom it may concern:*

Be it known that I, LEVI BLUNK, a citizen of the United States, residing at Louisville, in the county of Jefferson and State of Kentucky, have made a new and useful Improvement in Wheel-Wrenches, of which the following is a specification.

My invention is an improvement in wrenches for use on wheels, designed for removing a nut on the end of a spindle which operates to retain the hub of the wheel on the spindle; and the present invention has for an object to provide improved constructions whereby the said nut may be removed by turning the wheel backwardly, the wrench being provided with means for engagement by the spokes of the wheel, so the turning of the wheel will operate the wrench in both operations of applying and removing the nut.

The invention consists in certain novel constructions and combinations of parts, as will be hereinafter described and claimed.

Figure 1 is a face view of a wheel, partly broken away, provided with my invention. Fig. 2 is a sectional view on about line 2 2 of Fig. 1. Fig. 3 is a detail perspective view of the wrench. Fig. 4 is a detail cross-sectional view on about line 4 4 of Fig. 3, and Fig. 5 is a detail perspective view of the wrench-head.

In carrying out my invention I provide a wrench-head A and a carrier B therefor, on which the head is adjustable and may be secured in any adjustment. This is effected by providing the carrier B with an arm B', which passes through the slot A' in the head A, a screw C being provided for securing the head in any desired adjustment. I prefer to provide the arm B' on one end of and at right angles to the main arm $B^2$ of the carrier B and to form the free end of the arm B', as shown at D, with two sizes of wrench-sockets, so the part B may be used as a hand-wrench whenever desired. The head A is provided on both its inner side E and its outer side F with wrench-sockets and can be reversed upon the arm B', as will be understood from Fig. 3, to present either of said sockets for engagement with the nut. This reversal can be readily accomplished by releasing the screw C and withdrawing the head from the arm B' and reapplying it to such arm as may be desired. The socket E is in the nature of a box adapted to receive the nut, the bottom E' of such box being partly cut away and beveled on its edge, so it will drop easily over the nut in applying the wrench to position shown in Fig. 2. As will be noticed from the construction shown in Fig. 2, the carrier is provided with means, presently described, for holding it to the wheel-spokes, and when the wheel has been operated to remove the nut it may be laid on its side, and the wrench will maintain the nut in proper position for reapplication to the spindle whenever it is desired to again fit the wheel on such spindle. The arm $B^2$ of the carrier is adapted at $B^3$ to fit between the spokes of the wheel and is conformed in cross-section at such point to the space between the wheel-spokes adjacent to the hub so it will properly fit into such space, and is also covered with a tubing of rubber to prevent injury to the spokes. Beyond the portion $B^3$ the carrier is provided with a stem $B^4$, threaded to receive the nut $B^5$, and also receiving a cushioned cross-bar $B^6$, which is impelled by a spring $B^7$ toward the portion $B^3$ of the carrier. The pressure of the portion $B^6$ is regulated by adjusting the nut $B^5$ to vary the tension of the spring $B^7$, and the purpose of the cross-bar $B^6$ is to bear against the inner side of the spokes on opposite sides of the space within which the portion $B^3$ is fitted and operates to secure the carrier in place, as will be understood from Fig. 2. This adjustment of the cross-bar $B^6$ permits the fitting of the wrench to hubs of different lengths, while the adjustment of the wrench-head A permits the adaptation of the wrench to hubs differing in diameter. As best shown in Fig. 3, it is preferred to provide an enlarged portion *b* at the outer end of the portion $B^3$, which fits between the spokes, such enlargement overlapping the front sides of the spokes, and the cross-bar $B^6$ overlapping the spokes at their inner sides, so the carrier will be clamped in position between the spokes.

Having thus fully described my invention, what I claim as new, and desire to secure by Letters Patent, is—

1. A wheel-wrench consisting of a carrier having a main arm provided with a portion to fit between the spokes and conformed in cross-section to the space between such parts and having on its inner end a stem, a crossbar, spring and nut operating on said stem, the carrier being provided at the outer end of the main arm with a right-angled arm, and the wrench-head supported on the said right-angled arm, substantially as set forth.

2. A wheel-wrench having a carrier provided with a portion to fit between the spokes of the wheel and tapered or V-shaped in cross-section whereby it is conformed to the space between such parts, substantially as set forth.

3. The combination in a wheel-wrench, of a carrier provided with an arm arranged to cross the end of a hub and provided on said arm with a wrench-head having in one side a box-like receptacle for the nut, said receptacle having its lower wall partly cut away to facilitate the application of the head to the nut, such bottom wall being arranged to support the nut when the latter is removed from the spindle, substantially as and for the purposes set forth.

4. The combination in a wheel-wrench, of the carrier having a main arm provided with a portion to fit between the spokes, a cross-bar slidable bodily on said main arm toward and from such portion, and a spring for operating such cross-bar, substantially as set forth.

5. A wheel-wrench comprising a carrier provided with a wrench-head and having a main portion to fit between the spokes of the wheel, and a spring-pressed cross-bar bearing against the inner sides of such spokes, substantially as set forth.

6. A wheel-wrench having a carrier provided with a main arm having a portion to fit between the spokes of the wheel and enlarged at the outer end of such portion, forming a shoulder to bear against the outer sides of the spokes, and a cross-bar to bear against the inner sides of the spokes, substantially as set forth.

LEVI BLUNK.

Witnesses:
JOSEPH GRANTZ,
WM. WEIR.